US009417031B2

(12) United States Patent
Giaretta

(10) Patent No.: US 9,417,031 B2
(45) Date of Patent: Aug. 16, 2016

(54) DEVICE FOR CONTROLLING THE IMPULSIVE FEEDING OF A PRESSURIZED FLUID AND AN AIR WEAPON COMPRISING SUCH DEVICE

(71) Applicant: Demis Giaretta, Altavilla Vicentina (IT)

(72) Inventor: Demis Giaretta, Altavilla Vicentina (IT)

( * ) Notice: Subject to any disclaimer, the term of this patent is extended or adjusted under 35 U.S.C. 154(b) by 210 days.

(21) Appl. No.: 14/383,550

(22) PCT Filed: Mar. 29, 2013

(86) PCT No.: PCT/IB2013/052550
§ 371 (c)(1),
(2) Date: Sep. 6, 2014

(87) PCT Pub. No.: WO2013/144920
PCT Pub. Date: Oct. 3, 2013

(65) Prior Publication Data
US 2015/0013655 A1      Jan. 15, 2015

(30) Foreign Application Priority Data

Mar. 30, 2012   (IT) ............................... VI2012A0077

(51) Int. Cl.
*F41B 11/723*       (2013.01)
*F41B 11/62*        (2013.01)
*F41B 11/60*        (2013.01)
*G05D 16/06*        (2006.01)

(52) U.S. Cl.
CPC .............. *F41B 11/723* (2013.01); *F41B 11/60* (2013.01); *F41B 11/62* (2013.01); *G05D 16/0608* (2013.01); *Y10T 137/783* (2015.04)

(58) Field of Classification Search
CPC ...... F41B 11/62; F41B 11/721; F41B 11/723; F41B 11/72; F41B 11/00; F41B 11/60; F41B 11/722; F41B 11/68
USPC .......................................................... 124/73
See application file for complete search history.

(56) References Cited

U.S. PATENT DOCUMENTS 3,102,553 A * 9/1963 Ottestad ................... F16K 17/10
                                                     137/505.13
4,525,183 A * 6/1985 Cordes ................. B01D 53/261
                                                     137/543.15

(Continued)

FOREIGN PATENT DOCUMENTS

DE      202007017818      2/2008
KR         101035101      5/2011

*Primary Examiner* — Troy Chambers
*Assistant Examiner* — Bridget Cochran
(74) *Attorney, Agent, or Firm* — Themis Law

(57) ABSTRACT

A device for controlling fluid delivery includes a hollow body closed by opposed end walls having an inlet and an outlet for a pressurized fluid and defining a first variable-volume chamber, between the inlet and the outlet for containing a first volume of pressurized fluid, an obturating member interacting with the downstream end wall of the hollow body for selectively closing the outlet, a guide member associated with the obturating member guiding it between a first end closing position and a second end opening position of the outlet; and an operating system acting upon the closure member to promote sliding thereof in the hollow body. The obturating member is movable relative to the guide member and is internally hollow to enclose the first chamber, and the guide member has a passage allowing fluid communication between the inlet and the first chamber. An air weapon incorporating the device.

9 Claims, 4 Drawing Sheets

(56) References Cited

U.S. PATENT DOCUMENTS

| | | | | |
|---|---|---|---|---|
| 4,644,843 A * | 2/1987 | Soper | ............... | F41A 1/04 89/7 |
| 5,275,202 A * | 1/1994 | VanDeVyvere | ........ | F16K 17/10 137/492 |
| 7,665,396 B1 * | 2/2010 | Tippmann, Jr. | ........... | B25C 1/08 124/56 |
| 7,699,046 B1 * | 4/2010 | Benavides | .............. | F41B 11/62 124/56 |
| 7,866,308 B2 * | 1/2011 | Jones | ...................... | F41B 11/00 124/56 |
| 8,757,582 B2 * | 6/2014 | Robinson | ............ | F16K 31/1221 251/25 |
| 2002/0104523 A1 * | 8/2002 | Juan | ........................ | F41B 11/00 124/56 |
| 2011/0271940 A1 * | 11/2011 | Meggs | .................. | F41B 11/641 124/56 |
| 2015/0020787 A1 * | 1/2015 | Tseng | ..................... | F41B 11/00 124/73 |

* cited by examiner

DEVICE FOR CONTROLLING THE IMPULSIVE FEEDING OF A PRESSURIZED FLUID AND AN AIR WEAPON COMPRISING SUCH DEVICE

FIELD OF THE INVENTION

The present invention generally finds application in the field of fluid-operated systems, and particularly relates to fluid delivery control device.

The invention further relates to an air weapon incorporating such device.

BACKGROUND ART

Various kinds of equipment operating by being fed with a compressed gas, such as air or carbon dioxide, are known, wherein gas must be fed into an expansion chamber at a relatively high pressure and later ejected by pulses to act upon an actuator element or another operating part of the equipment.

Similar uses are known, for instance, in percussion tools or in air weapons, or "softair" weapons.

Particularly, the latter have a compressed air tanks for controlled supply of a chamber with a bullet therein, to impart a high-energy pulse thereto for bullet ejection.

Fluid delivery control devices are also known, which control instant release of the energy associated with a compressed working fluid in an actuator device.

Nevertheless, the compressed gas supply systems of these devices have a poor efficiency and are not easily rearmed, particularly when manually operated gas compression systems are used.

On the other hand, if the compressed gas is contained in a tank to be connected to the bullet loading chamber, a considerable waste of fluid occurs at each shot.

U.S. Pat. No. 3,102,553 discloses a valve device for controlling pressurized fluid delivery, comprising a hollow body with an inlet and an outlet for a pressurized fluid.

A movable valve element is housed in the hollow body, and is adapted to selectively open and close the outlet to control fluid delivery and ejection.

Particularly, two separate variable-volume chambers have been formed in the hollow body, which are supplied with respective pressurized fluids through separate supply circuits, such that opposed forces may be exerted on the valve element, which will close the outlet under equilibrium conditions.

In order to break the equilibrium and allow the valve element to slide and clear the outlet and allow gas ejection, additional pressure must be provided at one of the two sides of the valve element by supplying an additional volume of fluid through a third supply conduit.

This solution appears to be particularly complex and difficult to use in equipment, such as tools and weapons, that must ensure practical use.

Namely, control of pressure of the various fluids requires connection of the various conduits to separate external fluid supply circuits.

DISCLOSURE OF THE INVENTION

The object of the present invention is to overcome the above drawbacks, by providing a device for controlling delivery of a pressurized fluid that is highly efficient and relatively cost-effective.

A particular object of the present invention is to provide a device for controlled delivery of a pressurized fluid that allows substantially instantaneous release of energy associated with the compressed fluid, and with particularly short reaction times.

A further object of the present invention is to provide a device for controlled delivery of a pressurized fluid that has a small number of components and can be easily mounted and ensures practical use.

Another important object of the present invention is to provide a device for controlled delivery of a pressurized fluid that allows use of particularly simple control means for its operation.

These and other objects, as better explained hereafter, are fulfilled by a device for controlling impulsive feeding of a pressurized fluid as defined in claim 1.

With this combination of features, the device will afford particularly short reaction times, which will make it particularly suitable for use in equipment requiring instantaneous activation, such as air or gas weapons.

In a further aspect, the invention relates to an air weapon incorporating such device, as defined in claim 9.

Advantageous embodiments of the invention are obtained in accordance with the dependent claims.

BRIEF DESCRIPTION OF THE DRAWINGS

Further characteristics and advantages of the invention will become more apparent upon reading the following detailed description of a few preferred non exclusive embodiments of the device of invention and a weapon incorporating the device, which are described by way of a non limiting example with the help of the accompanying drawings in which.

DETAILED DESCRIPTION OF A PREFERRED EMBODIMENT

Figure 1:
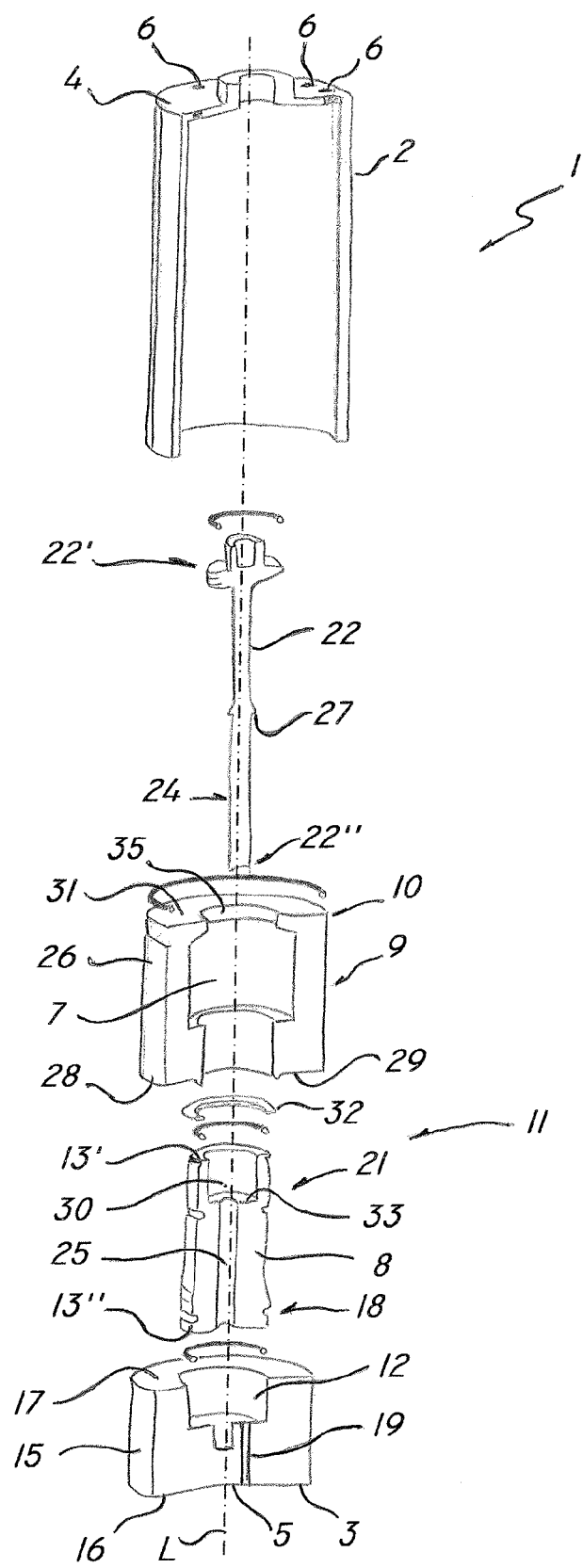
FIG. 1 is a perspective exploded sectional view of a device of the invention according to a first preferred embodiment.

Referring to the above figures, there is shown a device for controlled delivery of a fluid, generally designated by numeral 1, which is adapted for installation in equipment, such as percussion tools, pneumatic actuators or soft air weapons, in which an impulsive force must be imparted to an operating member, such as a striking hammer or one or more bullets.

The device 1 is designed to be installed in the apparatus at the operating member and may operate with different types of compressed fluid, particularly a gas selected from the group including air and carbon dioxide.

A device 1 for controlled delivery of a pressurized fluid of the invention comprises a substantially cylindrical hollow body 2 having end walls 3, 4 and a longitudinal axis L.

The end walls 3, 4 include an inlet 5 and one or more outlets 6 respectively, for a pressurized fluid supplied by supply means, not shown, which may consist, for instance, of a tank having a valve for selectively promoting inflow and/or outflow of fluid through the inlet 5.

The hollow body 2 houses therein a first variable-volume chamber 7 interposed between the inlet 5 and the outlets 6, for containing a first volume $V_1$ of pressurized fluid.

The hollow body 2 further contains a obturating member 9 which is slideably accommodated therein and has an end portion 10 interacting with end wall 4 of the hollow body 2 located downstream according to the fluid flow direction, for selectively closing the outlets 6.

The obturating member 9 also has a guide member 8 associated therewith, which is adapted to slideably guide it in the hollow body 2 between a first closed end position of the outlets 6 and a second open end position thereof.

Conveniently, the sliding movement of the obturating member 9 between the two end positions is promoted by operating means 11, which are at least partially accommodated in the hollow body 2.

According to the invention, the obturating member 9 and the guide member 8 are coupled together for sliding relative to each other. Furthermore, the obturating member 9 is internally hollow to enclose or define the first variable-volume chamber 7, and the guide member 8 has a passage 14 therein for allowing fluid communication between the inlet 5 and the first chamber 7.

Thus, control of the fluid flow introduced and/or ejected through the inlet 5 will allow control of the volume $V_1$ of pressurized fluid in the first chamber 7 and generate an instantaneous pressurized fluid flow at the outlet 6, using the fluid that comes from the inlet 5 only.

In a first preferred configuration, as shown in FIG. 1, the hollow body 2 has therein, at the upstream end wall 3, a second variable-volume wall 12 located upstream from the first chamber 7, between the inlet 5 and the passage 14 in the guide member 8.

The second chamber 12 is constantly in fluid communication both with the fluid inlet 5 and, through the passage 14 in the guide member 8, with the first variable-volume chamber 7.

Therefore, the guide member 8 is interposed between the first chamber 7 and the second chamber 12 and has a substantially cylindrical shape, preferably coaxial with the hollow body 2, with end faces 13', 13" received in the first chamber 7 and the second chamber 12 respectively.

Conveniently, the guide element 8 may be slideably fitted into the hollow body 2 to axially slide in response to a difference of opposed forces $F_1$, $F_2$ exerted on the end faces 13', 13" by the pressurized fluid in both separate chambers 7, 12.

Thus, the guide member 8 may interact with the obturating member 9 to promote axial sliding thereof from the first closed end position to the second open end position, thereby causing instantaneous discharge of the first volume $V_1$ of pressurized fluid from the first chamber 7, to provide the impulsive force required for actuation of the operating members of the apparatus with which the device 1 is associated.

The fluid communication between the first chamber 7 and the second chamber 12 allows control of pressure $P_1$ in the first chamber 7 by control of pressure $P_2$ in the second chamber 12.

The device 1 may include a cylindrical member 15 designed to be introduced into the hollow body 2 and having a first front surface 16 adapted to define the end wall 3 of the hollow body 2 located at the inlet 5. For instance, the cylindrical member 15 may be externally threaded, which allows it to be tightened on an internally matingly threaded portion of the hollow body 2.

Furthermore, the cylindrical member 15 includes a second front surface 17, for delimiting the second chamber 5 upstream, said second chamber 5 being delimited downstream from the end face 13" of the guide member 8.

Particularly, the second chamber 12 may be contained in the cylindrical member 15 and conveniently the substantially cylindrical guide member 8 has a first end portion 21 comprising the first end face 13' sliding in the first chamber 7 and a second end portion 18 having the end face 13" slideably introduced into the second chamber 12.

Conveniently, a substantially longitudinal vent channel 19 may be formed in the cylindrical member 15 for air escape during the back motion of the guide member 8, as more clearly explained below.

The first end portion 21 of the guide member 8 may be operably coupled to the obturating member 9 to promote axial sliding thereof after the sliding movement of the guide member 8, the latter being caused by a predetermined difference between the mutually opposed forces $F_1$, $F_2$.

The maximum values of the volumes $V_1$, $V_2$ of the two chambers 7, 12 may be selected to create an equilibrium between the oppositely directed forces acting upon the guide member 8 and the obturating member 9, when the latter is in the closed position.

Figure 2:
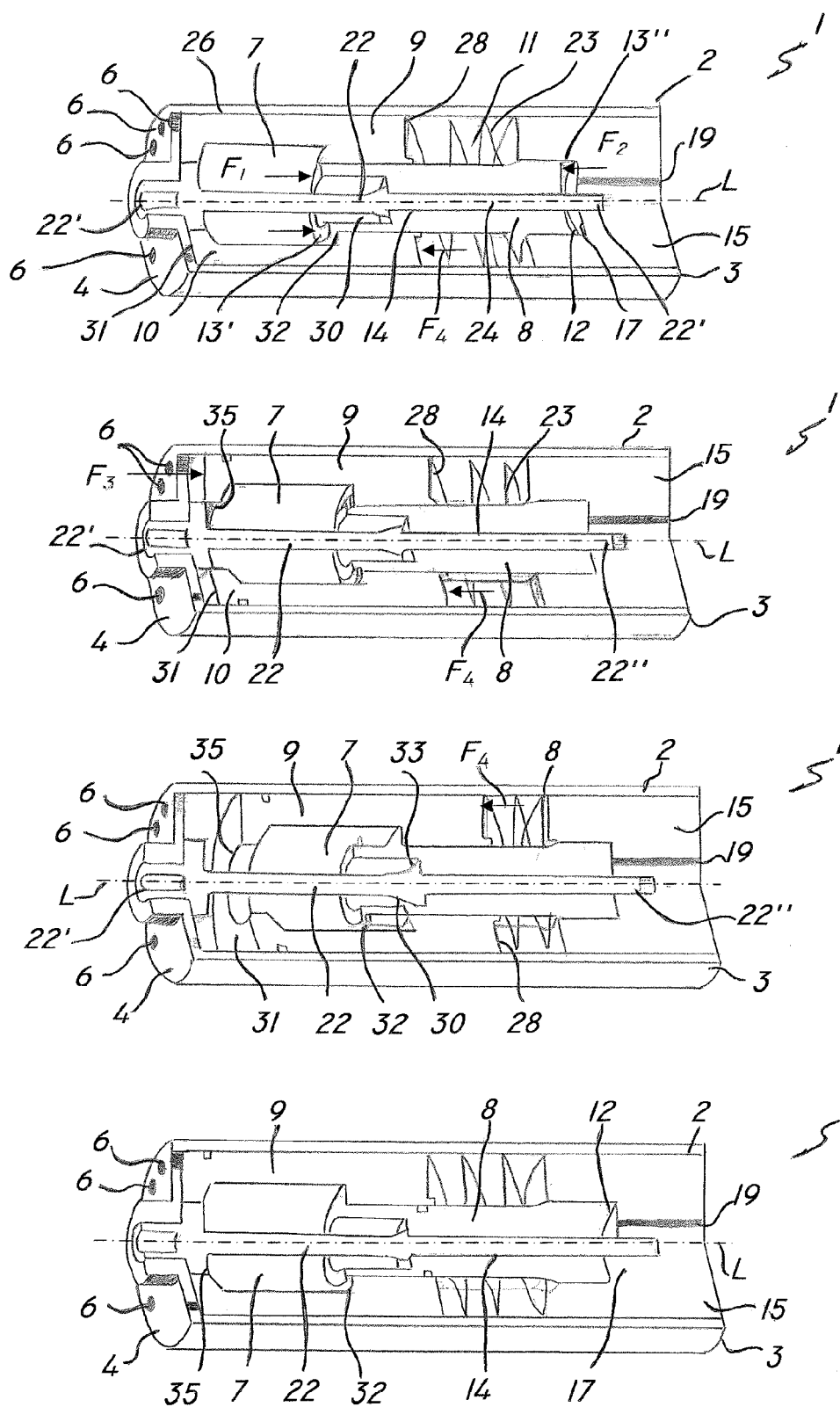
FIG. 2 is an operation sequence of the device of FIG. 1 as shown in a broken-away front perspective view.

Obviously, the intensity of the forces $F_1$, $F_2$ also depends on the sections upon which the volumes $V_1$ and $V_2$ act. For example, as shown in FIG. 2, the second volume $V_2$ of compressed fluid will act upon the entire second end face 13" of the guide member 8, whereas the first volume $V_1$ will act both upon the first end face 13' of the guide member 8 and upon a portion of the obturating member 9.

By appropriate sizing of such sections, the oppositely directed forces generated by longitudinally opposite parts of the guide member 8 may be changed, and the time of instantaneous fluid discharge through the outlet 6 may be set.

By way of example and without limitation of the invention, the first chamber 7 has a section $S_1$ and a volume $V_1$ which are smaller than the section $S_2$ and the volume $V_2$ of the second chamber 12.

Furthermore, as better explained hereafter, the two forces $F_1$, $F_2$ generated by the volumes $V_1$, $V_2$ of pressurized fluid may also have different moduli, particularly with $F_2<F_1$, in which case the operating means 11 may be configured to exert an additional force upon the obturating member 9 in the same direction as the force $F_2$ that is used to promote the passage from the open position to the closed position after ejection of the compressed fluid.

Conveniently, the guide member 8 may be axially movable between a first end position in which the second chamber 12 has a maximum volume $V_2$ and the obturating member 9 closes the outlets 6 and a second end position in which the second chamber 12 has a minimum volume $V_2$, possibly even a substantially zero volume, and the obturating member 9 opens the outlets 6.

Particularly, the guide element 8 may move between the first and second end positions along a first predetermined stroke, for causing the obturating member 9 to axially slide along the same stroke.

Actuation of the supply means valve, not shown, to discharge the fluid in the second chamber 12 through the inlet 5 will allow the guide member 8 to move from the first to the second end positions, under the pressure $P_1$ acting in the first chamber 7.

This is because the decreased pressure $P_2$ of the fluid in the second chamber 12 will cause a decrease of the force $F_2$ acting on the second end face 13" of the guide member 8.

In operation, as schematically shown in FIG. 2, actuation of the valve to cause fluid delivery through the inlet 5 allows displacement of the guide member 8 from the second end position to the first end position.

This is because the increased pressure $P_2$ of the fluid in the second chamber 12 will cause an increase of the force $F_2$ generated by the second volume $V_2$ and acting on the second end face 13".

By contrast, ejection of the compressed fluid from the second chamber 12, e.g. through the same inlet 5 or through the vent 19 will generate an unbalance between the force $F_1$ generated by the first volume $V_1$ of fluid on the first face 13' of the guide member 8 and the force $F_2$ generated by the second volume $V_2$ and acting on the second end face 13".

When such difference exceeds a predetermined value, the guide element 8 will axially slide to the second end position, thereby carrying with it the obturating member 9 from the first closed position to the second open position.

As the obturating member 9 slides, its end portion 10 will move away from the downstream end wall 4 off the hollow body 2, while allowing at least partial opening of the outlets 6.

Conveniently, the obturating member 9 may be configured to axially slide relative to the guide member 8 along a second predetermined maximum stroke.

Particularly, the fluid flowing out of the outlets 6 facilitates the axial displacement of the obturating member 9 relative to the guide member 8, for instantaneous change of the volume of the first chamber 7.

Furthermore, as fluid flows through the outlets 6, it may apply an additional force $F_3$ on the end portion 10 of the obturating member 9, having the same direction as the force $F_1$ generated by the first volume $V_1$.

Such additional force $F_3$ will further facilitate the axial sliding motion of the obturating member 9 on the guide member 8, thereby placing the end portion 10 of the obturating member 9 at a predetermined distance from the downstream end 4 of the hollow body 2.

Conveniently, the operating means 11, may include an elastic member 23 acting upon the obturating member 9 and adapted to exert an additional force $F_4$ thereon, in the same direction as the force $F_2$ exerted by the fluid in the second chamber 12, for the obturating member 9 to automatically spring back into the closed position of the outlets 6 upon discharge of the compressed fluid from the first chamber 7.

For example, the elastic member 23 may be a spiral spring or the like, coaxial with the guide member 8 and accommodated outside it, particularly between the cylindrical member 15 and the obturating member 9.

The coefficient of elasticity of the spring 23 may be selected in view of assisting the obturating member 9 in springing back from the position in which it is at the maximum distance from the downstream end 4 of the hollow body 2 to the position in which it closes the outlets 6 within a predetermined time, that shall be short enough and allow quick closure of the device 1 upon complete discharge of the fluid contained in the first chamber 7.

Conveniently, the passage 14 in the guide member 8 may be small enough to allow controlled leakage of fluid from the second chamber 7 to the first chamber 12.

Particularly, the passage 14 may be of substantially capillary size, to allow controlled fluid of compressed fluid from the second chamber 12 to the first chamber 7 during a time longer than the time required by the spring 23 to move the obturating member 9 back to the closed position.

This will prevent any ingress of fluid into the first chamber 7 when the latter is in fluid communication with the outside through the outlets 6 or will allow only a very small amount of fluid therein.

With this particular arrangement, the device 1 of the present invention will dramatically reduce the waste of compressed fluid that typically occurs during rearming of prior art devices.

In the configuration of FIGS. 1 and 2, a substantially central rod 22 is also provided, which extends substantially along the entire longitudinal length of the hollow body 2 with opposite longitudinal ends 22', 22" stably fixed within the hollow body 2.

For instance, the opposite longitudinal ends 22', 22" may be externally threaded, for screw coupling with matingly threaded portions of the hollow body 2 and the cylindrical member 15 respectively.

The central rod 22 has a substantially longitudinal cylindrical shape and such as a size as to extend through both the first chamber 7 and the second chamber 12, with an intermediate length 24 fitted with a small clearance in a longitudinal channel 25 of the guide member 8 to delimit the leakage passage 14 therewith.

Thus the rod 22 will in turn both act as a slide guide for the guide member 8 and ensure an adequate mechanical strength of the hollow body 2.

Figure 3:
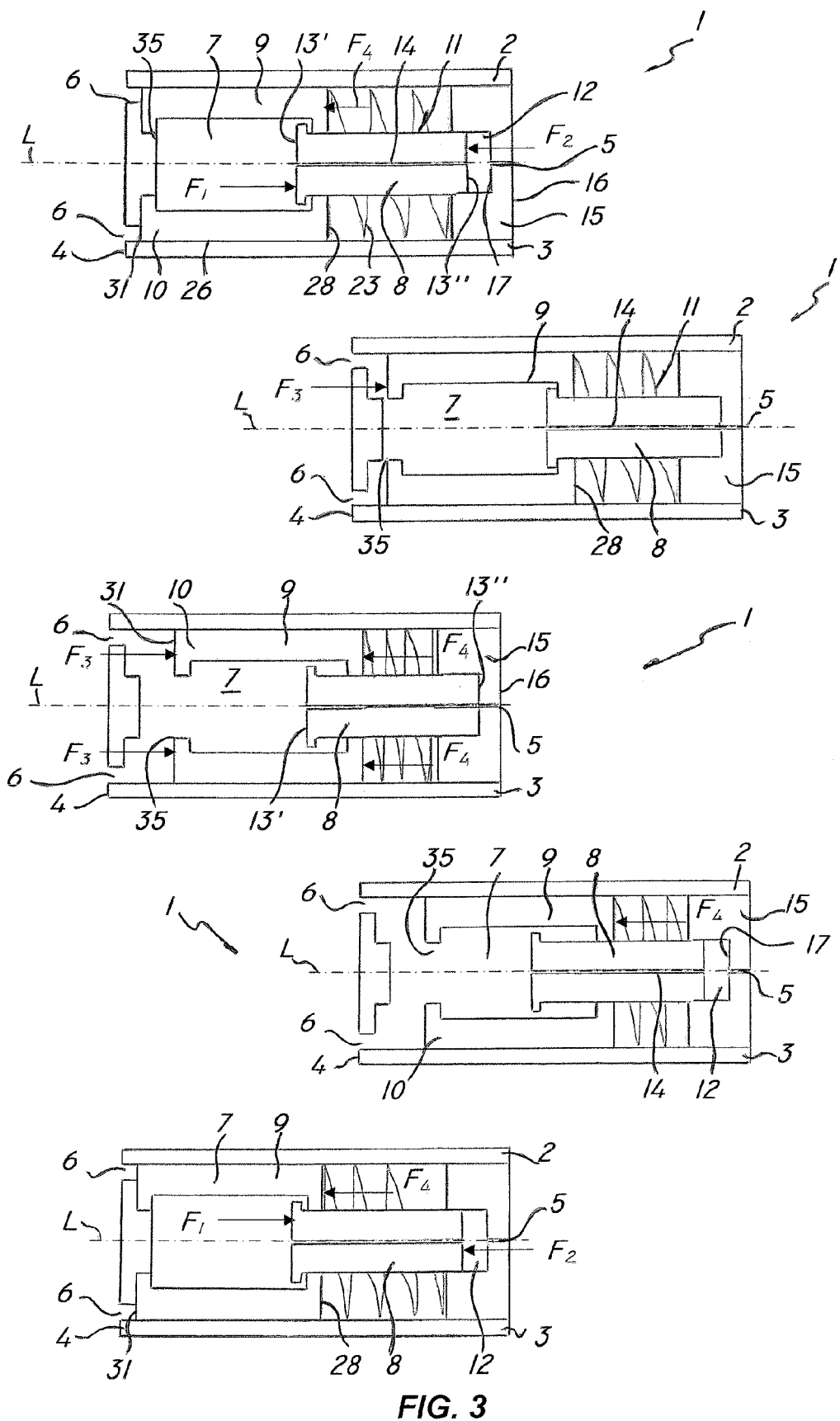
FIG. 3 is an operation sequence of the device of the invention in a second preferred configuration, in a broken away front view.

In the configuration as schematically shown in FIG. 3, the leakage passage 14 may instead consist of a longitudinal central through channel extending through the entire guide member 8.

In both configurations, the obturating member 9 has a substantially tubular shape, with a substantially cylindrical and longitudinal peripheral wall 26 fluid-tightly sliding in the hollow body 2.

The longitudinal peripheral wall 26 may enclose the first chamber 7 and may be closed upstream by a first substantially transverse wall 28 having a longitudinal hole 29 for allowing coupling with the guide member 8, and downstream by a second substantially transverse wall 31 having a central opening 35 for allowing fluid communication with the outlets 6.

Conveniently, the guide member 8 includes a driving ring 32 integral with the first end 22' and adapted to engage the first substantially transverse wall 28 of the obturating member 9 for axially driving it from the first end position to the second end position.

For example, the driving ring 32 may be a Seeger locking ring, an elastic ring, a pair of crescent rings or a similar member.

Furthermore, the presence of the driving ring 32 prevents the first end portion 21 of the guide member 8 from coming out of the hole 29 formed in the obturating member 9 and allows the first face 13' thereof to be constantly held within the first chamber 7.

The rod 22 may have an abutment surface 27 for the guide member 8, for placing the latter at the first end position.

The guide member 8 may have a recess 30 with a substantially transverse wall 33, which is longitudinally offset from the first end face 13', adapted to interact with the abutment surface 27 of the rod 22.

Conveniently, the downstream end wall 4 of the hollow body 2 faces the second substantially transverse wall 31 of the obturating member 9 and has a plurality of substantially axial outlets 6, which are adapted to be put in fluid communication with the central opening 35.

Particularly, if the device 1 is designed for use in an air weapon, the outlets 6 may be arranged along a circumference, in angularly equally spaced relationship, to allow the discharged fluid to flow out of the hollow body 2 in a substantially axial outflow direction.

Figure 4:
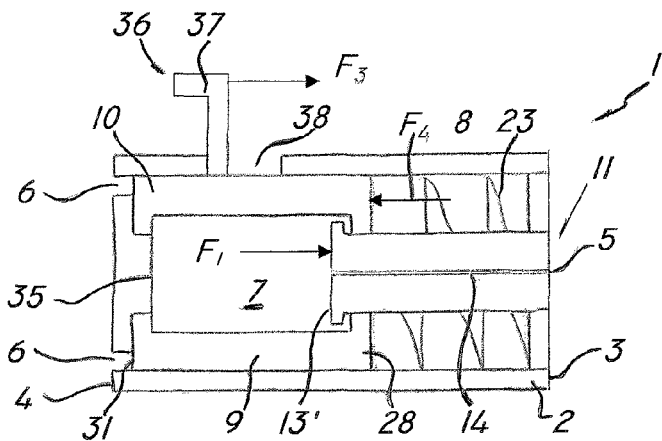
FIG. 4 is a schematic view of a device of the invention in a third preferred embodiment.

In a further embodiment of the device, as schematically shown in FIG. 4, the operating means 11 may include a mechanical or electromechanical actuator 36, for promoting the sliding motion of the obturating member 9 from the first end position to the second end position.

Here, the guide member 8 may be fixedly accommodated in the hollow body 2, and abut against the end wall 3 thereof, such that no second chamber 12 is provided.

The actuator 36 may be of the manually operated type, with a pin 37 integral with the obturating member 9 and sliding in a groove 38 formed in the side wall of the hollow body 2.

Thus, once the first chamber 7 has been loaded in a usual manner, the pin 37 may be operated to exert on the obturating member 9 the force required to overcome the force of the spring 23, thereby causing the obturating member 9 to slide and open the outlets 6 to eject the compressed fluid.

After such discharge, the inflow will fill the first chamber 7 again through the leakage passage 14, and the spring 23 will move the obturating member 9 back to the first closed end position.

Alternatives to manual actuators may be automatic actuators, or actuators controlled by small electromechanical motors or magnetic systems, with no particular limitation.

Figure 5:
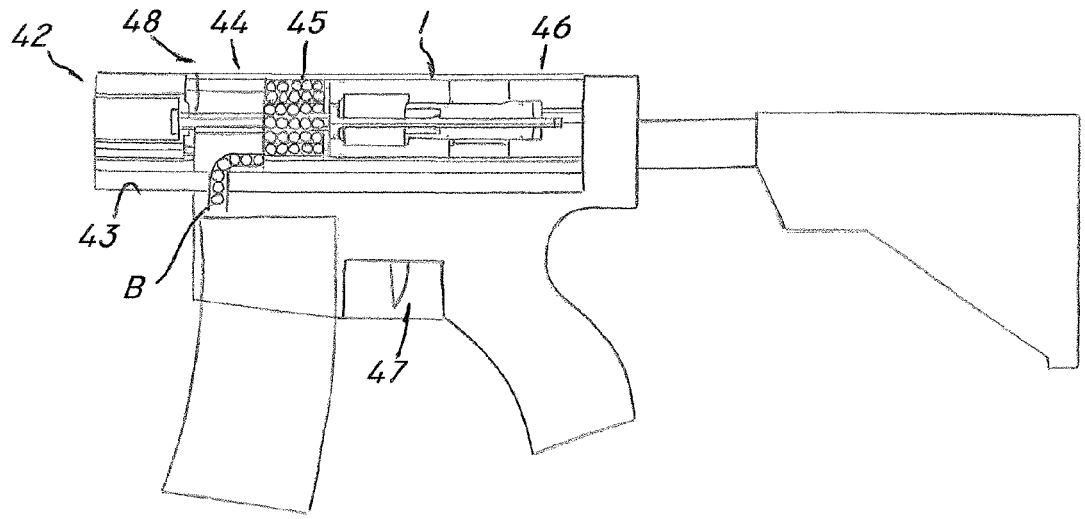
FIG. 5 is a partially broken away schematic view of an air weapon comprising a device according to the invention.

In a further aspect, the present invention provides an air weapon 42, as schematically shown in FIG. 5, which comprises a barrel 43 for directing and propelling one or more bullets B, means for loading 44 the bullets B into a loading portion 45 of the barrel 43, means 46 for controlled feeding of a compressed fluid into the barrel 43 for propelling the bullets B and triggering means 47 for controlling the release of compressed fluid to the bullets B.

According to a peculiar characteristic of the weapon 42, the supply means 46 include a device 1 for controlling the delivery of pressurized fluid as described above, which is interposed between the triggering means 47 and the loading portion 45 of the barrel 43.

While a gun-type weapon 42 is schematically shown in FIG. 5, such weapon may be any soft air weapon having a barrel or propelling tube 43 for housing one or more bullets for pistols, guns, mortars or the like.

Particularly, the propelling barrel 43 may have a first housing for a compressed gas tank and a second housing, adjacent to the first housing, in which the device 1 is placed for allowing fluid communication between the outlets 6 and the bullet loading area for loading bullets into the propelling barrel 43 and for using the impulsive flow from the outlets 6 to transfer the energy required for propulsion to the bullet B.

The trigger means 47 may include one or more user-operable levers, for manually promoting air delivery into the inlet 5 of the device 1 and allow air to fill the first chamber 7 and then the second chamber 12, as described above.

A particularly important advantage is that, regardless of the presence of the device 1 of the invention, the loading means 44 may include a novel device 48 for loading bullets B provided in the loading portion 45.

Figure 6:
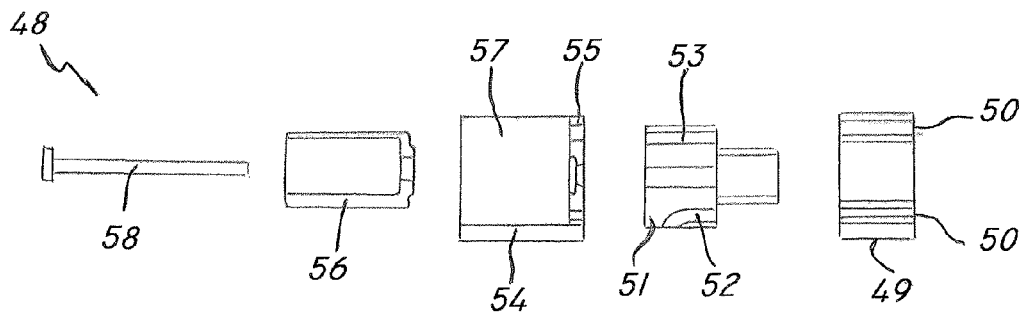
FIG. 6 is an exploded broken away view of a detail of the weapon of FIG. 5.

Particularly, as more clearly shown in FIG. 6, the loading device 48 will include a substantially cylindrical part, known as cylinder 49, which is rotatably housed in the propelling barrel 43, coaxial therewith.

The cylinder 49 has one or more longitudinal channels 50, each adapted to accommodate a longitudinal row of substantially spherical bullets B. The individual channels 50 may be suitably aligned with respective outlets 6 of the hollow body 2 to receive the ejected fluid.

If no control device 1 is provided, the channels 50 will be in fluid communication with the known fluid delivery conduit, as suitably provided.

In any case, this will provide the undoubted advantage of simultaneously positioning a plurality of bullets B in the loading portion 45 of the barrel 43 for simultaneous propulsion thereof, unlike prior art weapons which provide propulsion of one bullet at a time.

Advantageously, the channels 50 do not extend all along the angular length of the cylinder 49, but through a smaller angle, to prevent leakage of unused compressed fluid, as no rows of bullets B may be present at the loading area.

A guide cylinder 51 is provided downstream from the cylinder 49, which has a curved conduit 52 for guiding the bullets B along a predetermined path to move the individual rows from a substantially vertical position, or transverse to the barrel 43 to a substantially horizontal position, or parallel to the longitudinal direction of the barrel 43.

The guide cylinder 52 also has a plurality of first longitudinal passages 53, which are adapted to be aligned with the positioning channels 50 of the bullets B to define an extension and allow the ejected fluid to have a mainly axial direction for most of the length of the barrel 43, while preventing transverse energy dispersion.

For this purpose, an additional cylindrical body 54 may be provided, which may be placed downstream from the guide cylinder 51 and has second passages 55, which are longitudinally aligned with the first passages 53 for further increasing the stroke of the bullets B with the fluid still having an essentially axial direction of propagation.

The loading device 48 is secured by a bell-shaped body 56, which fits into a central seat 57 of the cylindrical body 54 and allows assembly of the whole loading device, using a through pin 58, in addition to being fixed to the control device 1 of the invention.

The above disclosure clearly shows that the present invention fulfills the intended objects and particularly meets the requirement of providing a device for controlling pressure of a fluid that ensures high effectiveness and considerably reduces fluid waste.

The device and weapon of the invention are susceptible to a number of changes or variants, within the inventive concept disclosed in the appended claims. All the details thereof may be replaced by other technically equivalent parts, and the materials may vary depending on different needs, without departure from the scope of the invention.

While the device and weapon have been described with particular reference to the accompanying figures, the numerals referred to in the disclosure and claims are only used for the sake of a better intelligibility of the invention and shall not be intended to limit the claimed scope in any manner.

The invention claimed is:

1. A device (1) for controlling impulsive feeding of a fluid, comprising:
   a substantially cylindrical hollow body (2) with a longitudinal axis (L) and with opposite closure end walls (3, 4) having respectively at least one inlet (5) and at least one outlet (6) for a pressurized fluid, wherein said hollow body (2) has internally:
   a first variable volume chamber (7) interposed between said inlet (5) and said outlet (6) for containing a first volume ($V_1$) of pressurized fluid ($P_1$);
   an obturating member (9) interacting with one of the end walls disposed downstream (4) of said hollow body (2) for selectively closing said outlet (6);
   a guide member (8) operatively coupled to said obturating member (9) for guiding said obturating member (9) between a first end closing position and a second end opening position of said outlet (6); and operating means (11) adapted to engage said obturating member (9) for promoting a sliding thereof into said hollow body (2) between said first and said second position;

wherein said obturating member (9) and said guide member (8) are reciprocally movable, said obturating member (9) being internally hollow to enclose said first chamber (7) and said guide member (8) having a passage (14) adapted to bring said inlet (5) in fluidic communication with said first chamber (7); and wherein said operating means (11) comprise a second chamber with variable volume (12) provided with said inlet (5) and adapted to receive a second volume ($V_2$) of pressurized fluid ($P_2$), said second chamber (12) being placed upstream of said first chamber (7) and in fluidic communication therewith through said passage (14), in such a manner to control a pressure ($P_1$) into said first chamber (7).

2. The device as claimed in claim 1, wherein said guide member (8) is substantially cylindrical with end faces (13', 13") housed respectively in said first chamber (7) and in said second chamber (12) for sliding into said hollow body (2) responsive to a difference between the opposite forces ($F_1$, $F_2$) produced on said end faces (13', 13") by the pressurized fluid and for promoting the sliding of said obturating member (9) and an instantaneous discharge of said first chamber (7).

3. The device as claimed in claim 1, wherein said guide member (8) is axially movable between a first end position wherein said second chamber (12) has maximum volume and said obturating member (9) closes said outlet (6), and a second end position wherein said second chamber (12) has minimum volume and said obturating member (9) opens said outlet (6).

4. The device as claimed in claim 1, wherein said obturating member (9) is substantially tubular with a substantially longitudinal peripheral wall (26) that is tightly slidable into said hollow body (2) and that encloses said first chamber (7), said peripheral wall (26) being closed at one end by a first substantially transverse wall (28) having a longitudinal hole (29) for coupling with said guide member (8) and at another end by a second substantially transverse wall (31) facing said downstream end wall (4) of said hollow body (2), said second transverse wall (31) having a central opening (35) adapted to place in fluidic communication said first chamber (7) with said at least one outlet (6).

5. The device as claimed in claim 4, wherein said guide member (8) has at an upstream end (18) a driving ring (32) adapted to engage said first substantially transverse wall (28) of said obturating member (9) for driving said obturating member (9) axially from said first to said second end position.

6. The device as claimed in claim 1, wherein said guide member (8) comprises a central rod (22) having opposite ends (22', 22") fixed to said hollow body (2) and having an intermediate length (24) inserted with minimum play in a longitudinal channel (25) of said guide member (8) for delimiting thereinto a passage (14) having a transverse section sufficiently reduced to allow a controlled flowing of the fluid from said second chamber (12) to said first chamber (7).

7. The device as claimed in claim 2, wherein said operating means (11) comprise an elastic member (23) acting on said obturating member (9) and adapted to exert thereon an additional force ($F_4$) with a same direction as the force ($F_2$) exerted by the second volume ($V_2$) of the fluid into said second chamber (12) to promote an axial sliding of said obturating member (9) from the opening position to the closing position of the outlet (6).

8. The device as claimed in claim 1, wherein said operating means (11) comprise a mechanical or electromechanical actuator (36) associated to said obturating member (9) for promoting an axial sliding thereof from said first to said second end positions.

9. An air weapon (42), comprising:

a barrel (43) for directioning and throwing at least one bullet (B);

loading means (44) of the at least one bullet (B) in a loading portion (45) of said barrel (43);

means (46) for controlled feeding of a pressurized fluid into said barrel (43); and triggering means (47) adapted to control a releasing of the pressurized fluid to said bullet (B) for a launching thereof;

wherein said means for controlled feeding (46) comprise a device (1) for the controlled feeding of the pressurized fluid according claim 1, said device being interposed between said triggering means (47) and said loading portion (45) of said barrel (43).

* * * * *